Nov. 8, 1966  S. W. KESSLER, JR  3,284,118
CERAMIC-TO-METAL SEALS
Filed Aug. 27, 1964

INVENTOR.
SEBASTIAN W. KESSLER, JR.
BY
L. A. Larsen
Attorney

United States Patent Office 3,284,118
Patented Nov. 8, 1966

3,284,118
CERAMIC-TO-METAL SEALS
Sebastian W. Kessler, Jr., Lancaster, Pa., assignor to Radio Corporation of America, a corporation of Delaware
Filed Aug. 27, 1964, Ser. No. 392,450
7 Claims. (Cl. 287—189.365)

The present invention relates to ceramic to sheet-metal seals, and particularly to butt seals between sheet-metal structures and ceramic bodies.

The expression "sheet-metal structures" as used herein, is intended to distinguish from rod-shaped or solid cylindrical structures, and not to indicate any particular thickness value. Thus, sheet-metal structures with which the invention is concerned may have a thickness such as, for example, may be required for a wall portion of a vacuum tube envelope. However, where the sheet-metal structure is formed by die drawing or spinning, it should be thin enough to permit use of these techniques of shaping. Sheet-metal structures according to the invention, may be of any shape, such as flat, tubular or dish-shaped, for example.

It is desirable in many areas, such as in power tubes and thermionic energy converters, to provide vacuum-tight envelopes formed of ceramic and sheet-metal parts and in which an elongated edge of the sheet-metal part or structure abuts and is sealed to a surface of the ceramic part. It is further desirable that a seal or joint between the edge of the sheet-metal structure and the surface of the ceramic part be free from seal rupturing stresses throughout a relatively wide temperature range.

One cause of seal rupturing stresses at elevated temperatures resides in an appreciable differential thermal expansion between the ceramic and the sheet-metal parts. Thus, where the sheet-metal part has an appreciably different coefficient of expansion than the ceramic part, seal rupturing stresses may be produced in the seal region of such magnitude as to destroy the seal.

Such stresses in a sealed structure of the type discussed, are predominantly of a shearing character caused by expansion of the metal structure in a direction normal to its thickness dimension and parallel to the seal region. When a point describes a curve, the direction of its motion is at each instant that of the corresponding tangent to the curve. Expansion of the sheet-metal structure in the direction of its thickness dimension is usually relatively small and stresses resulting therefrom are not as severe as those of the shearing type.

Seals between the edge of the sheet-metal structure and the flat surface of the ceramic part may be effected by a means of an interposed brazing material. While such brazing material may possess some resiliency so as to absorb stresses produced by relatively small differences in expansion between the sheet-metal and ceramic parts, the sealing or brazing material may be incapable of preventing seal rupture when the difference in expansion of the parts of the seal structure is substantial, such as when the sealed structure is exposed to relatively high temperatures of the order of 800° C. and higher.

Accordingly, it is an object of the invention to provide a seal between an edge of a sheet-metal part and a surface of a ceramic part, that is adapted to withstand the change from room temperature to relatively high temperatures without harmful results.

A further object is to provide a composite sheet-metal structure having a coefficient of expansion normal to its thickness dimension that is substantially equal to that of a ceramic part throughout a temperature range up to about 800° C. and higher, whereby a seal between an edge of the sheet-metal structure and a surface of the ceramic part is free from rupture throughout the aforementioned temperature range.

The composite sheet-metal structure of the invention comprises layers of material or alloys strongly bonded together and having a resultant thermal expansion response closely matching that of a part, made of ceramic, for example, to which the sheet-metal structure is to be sealed. Sheet-metal structures of this type introduce a problem not present where rod-shaped or solid cylindrical structures are involved. Thus, while solid cylindrical structures such as lead-in conductors for incandescent lamps and electron tubes may include only two layers of metals or alloys of different coefficients of expansion for satisfactory results, this is not feasible where composite sheet-metal structures are used. This is because the resultant bi-metallic sheet-metal structure having layers of different coefficients of expansion, flexes at relatively high temperatures, thereby inducing additional stresses at a seal region.

Accordingly, a further object of the invention is to provide a composite sheet-metal structure having two outer layers of metal of substantially similar expansion characteristics, and an intermediate layer of a different expansion response, whereby temperature-induced expansions of said composite structure throughout a temperature range from room temperature (about 20° C.) up to 800° C. and higher are substantially equal to that of a part, such as ceramic, for example, to which the composite structure is to be sealed, and in which the seal is free from rupture throughout the aforementioned temperature range.

Another object is to provide a multilayer composite sheet-metal structure wherein the thickness of each layer is such in relation to its coefficient of expansion, that the overall coefficient of expansion of the composite structure in a direction normal to its thickness dimension, substantially matches that of a part, such as ceramic, to which an edge of the composite structure is sealed, throughout a temperature range from about 20° C. up to about 800° C. and wherein the sheet-metal structure is free from substantial flexure in this temperature range.

Briefly considered, a seal free from rupture throughout a temperature range of from room temperature up to 800° C. and higher is effected as a consequence of a novel form of the composite sheet-metal structure. The composite sheet-metal structure includes at least three layers of metal so strongly bonded together that they are free from separation throughout the temperature range referred to.

The two outer layers of the composite sheet-metal structure are made of metals that have a given and substantially the same thermal expansion response from about room temperature to a temperature up to 800° C. and higher. The intermediate layer is made of a metal selected to have an expansion response different from said given response at the indicated temperature range. This different expansion response may be greater or smaller than the aforementioned given expansion response, as will be discussed more fully hereinafter.

The amount of restraint to lateral expansion of one or more of the layers of the composite structure is sufficient according to the invention, to cause the sheet-metal structure to have a predetermined lateral expansion response to temperature substantially equal to that of a part such as ceramic to which an edge of the sheet-metal structure is to be sealed. The lateral expansion response referred to occurs in a direction normal to the thickness dimension of the wall of the sheet metal structure. Where the seal region is elongated the direction of the lateral expansion response is that in which the seal region is elongated. In order to accomplish this result, the thickness and strength of the several layers are critical. The thickness and strength of the several layers are so chosen that the layer having the smaller expansion response, i.e., the intermediate or core layer, when incorporated in the composite structure, expands slightly beyond its normal expansion limit, while the layer or layers having the larger expansion response, i.e., the outer layers, expand to a lesser degree than their normal expansion limit due to the restraint by the core layer, throughout a predetermined temperature range.

In one example, a core layer of molydenum 21 mils thick is bonded on its two sides with outer layers made of an alloy known commercially as Inconel, having a thickness of 3.5 mils. Inconel is a trademark of International Nickel Company and consists of 76% nickel, 15% chromium and 9% iron, by weight. These three layers are bonded together strongly with an intermediate body of nickel between adjacent layers. The composite sheet-metal structure so produced possesses a coefficient of expansion in the lateral direction that so closely matches the coefficient of expansion or thermal expansion response of a ceramic part, such as aluminum oxide, to which it is sealed as by brazing, that the seal is free from rupture up to a temperature that may be limited only by the melting point temperature of the brazing material employed.

In the drawing to which reference is now made for examples embodying the invention, FIG. 1 is a side view in section of a fragment of a structure comprising a flat composite sheet-metal part and a ceramic part, wherein an edge of the sheet-metal part is bonded or sealed to a surface of the ceramic part in a seal adapted to tolerate a temperature of about 800° C. without rupture;

Figure 1:
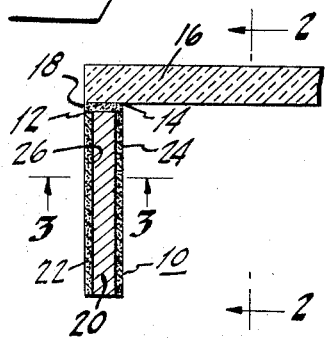
Figure 2:
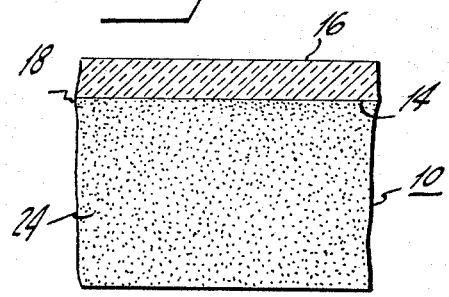
FIG. 2 is a partly sectional view taken along the line 2—2 of FIG. 1 and shows a side of the multilayer structure of the composite sheet-metal part.

In the example shown in FIGS. 1 and 2, a composite sheet-metal structure having a flat portion 10 is sealed at one edge 12 thereof to a surface 14 of a ceramic body 16. The ceramic body 16 may be made of aluminum oxide. The seal is effected by means of a brazing material 18.

The flat sheet-metal portion 10 is a composite structure and comprises three layers of metal strongly bonded to each other. The layers include a core or intermediate layer 20 and two outer layers 22, 24. The core layer 20 is made of a metal that in one example has a lower coefficient of expansion or thermal expansion response than the ceramic body 16. The two outer layers 22, 24 are made of a metal or alloy that has a higher coefficient of expansion than the ceramic body 16. Under these conditions, the composite structure 10, made up of such layers, has a coefficient of expansion that is larger than that of the core 20 and smaller than that of the outer layers 22, 24. The resultant of the expansions of the core 20 and the outer layers 22, 24, is substantially equal to the coefficient of expansion of the ceramic body 16, up to relatively high temperatures such as 800° C. and above. If desired, the core 20 may be made of the higher coefficient expansion metal and the outer layers 22, 24, may be made of the lower coefficient of expansion metal.

Figure 3:
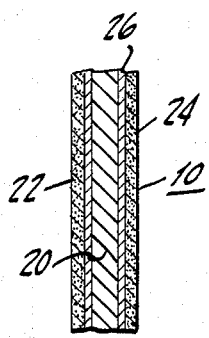
FIG. 3 is an enlarged sectional view of a fragment of the composite sheet-metal part shown in FIG. 1.

Since the bonding means between the several layers of the composite structure 10 is required to withstand substantial shearing stresses at elevated temperatures, produced by the difference in coefficient of expansion of the core and outer layers and severe forces in shaping, it is important that the bonding means be relatively rugged. One way in which the bond may be effected is by means of a body or layer of metal 26 (FIG. 3). Thus, in forming the composite structure 10, a layer of a suitable strong bonding metal 26 such as nickel, is interposed between the two surfaces of the core 20 and the outer layers 22, 24. The resultant loose layer assembly is then subjected to a suitably high pressure and temperature to effect a diffusion of the bonding layers into the adjacent layers of the composite structure.

By selecting appropriate metals for the several layers of the composite structure 10 and adjusting the thickness of each layer in accordance with its coefficient of expansion, the composite structure 10 may be caused to have a coefficient of expansion that is equal or sufficiently close to that of ceramic body 16, that a seal between the structure and the body is free from rupture throughout any given temperature range.

The thickness dimension and the strength of each of the layers of the composite structure are also important in relation to their elastic limit. Thus, each of the several layers should be thick and strong enough so that at the maximum temperature to which they are subjected in use, no layer is caused to contract or expand beyond its natural elastic limit. Once a layer has been stressed beyond its elastic limit, its reserve of elasticity has been depleted so that it contributes less to a controlled expansion in a composite sheet-metal structure.

The thickness and the strength of a layer of the composite structure determine the magnitude of its resistance to contraction or expansion. Thus, relatively thin layers of a weak metal of relatively high coefficient of expansion on the surface of a thick and strong sheet-metal core of relatively low coefficient of expansion, may be ineffective to desirably stabilize the overall lateral expansion of a multilayer sheet-metal structure. This is because the appreciably greater mass and strength of the core may increase the force of its thermal response to a degree that is substantially unaffected by the smaller mass of the outer layers. Therefore, the thickness and strength of the several layers are correlated with their coefficients of expansion in order to obtain a desired overall thermal expansion response of a sheet-metal structure constituted of the layers.

Figure 5:
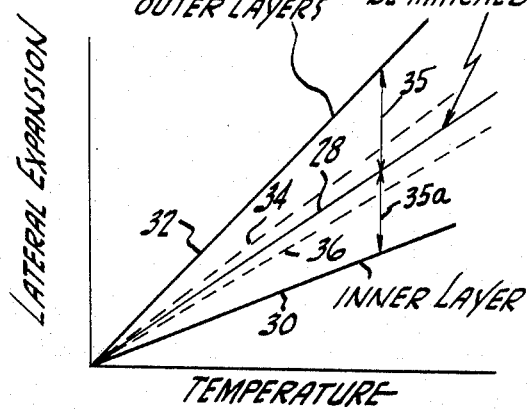
FIG. 5 is a functional graph illustrating general relationships between a core layer and two outer layers to produce an overall coefficient of expansion having a predetermined value so as to substantially match a part to which the multilayer structure is sealed.

The functional graph shown in FIG. 5 depicts expansion curves of several different materials. Curve 28 indicates the thermal expansion response of the body 16 to which the composite sheet-metal structure 10 is to be sealed. This body may be made of commercial alumina having 98% purity. Its thermal expansion response at 800° C. is 6 mils per inch. Curve 30 shows the thermal expansion response of the metal layer 20 that may serve as the intermediate or core layer of the composite sheet-metal structure. This metal may be molybdenum, which has a thermal expansion response of 4 mils per inch at 800° C. Curve 32 depicts the thermal expansion response of a metal useful as the outer layers 22, 24 of the composite sheet-metal structure. This metal may be an alloy known commercially as Inconel and which has a thermal expansion response of 12.5 mils per inch at 800° C. The dashed curves 34, 36 on each side of curve 28 represent tolerable limits of deviation of the overall thermal expansion response of the composite sheet-metal structure 10 from that of the body 16 having the thermal expansion response of curve 28. This deviation is tolerable because the brazing material in the seal region between the composite structure and the body may be sufficiently resilient to compensate for the deviation. This resiliency of the brazing material comprising the seal region compensates for the thermal expansion response of the composite sheet-metal structure in the direction of its thickness dimension, when the magnitude of this dimension is not excessive. In the example under consideration, the thickness of the composite sheet-metal structure 10 (FIG. 1) should not exceed about 30 mils for effective absorption by the brazing material of thermal expansion stresses in the direction of the thickness dimension of the structure, throughout a temperature range of from room temperature to about 800° C.

In order that the composite sheet-metal structure 10 and the body 16 to which it is sealed have substantially the same thermal expansion response, as indicated by the arrows 35, 35a (FIG. 5) the outer Inconel layers 22, 24 stretches the intermediate molybdenum layer 20 about 2 mils per inch so that the expansion of the molybdenum layer is substantially equal to that of the alumina body 16 which, as indicated, is 6 mils per inch at 800° C. At the same time, the Inconel layers 22 are contracted about 6 mils per inch at 800° C. In this way, the composite structure 10 has a thermal expansion response substantially equal to that of the alumina body 16, i.e., 6 mils per inch at 800° C.

From the foregoing, it will be seen that in correlating the thickness of the several layers to their coefficients of expansion, the molybdenum core layer 20 should have a thickness about three times the thickness of the combined outer layers 22, 24 of Inconel alloy. This ratio agrees with the ratio of thermal expansion response between the core layer and the two outer layers. Thus, in the example under consideration, the molybdenum layer may have a thickness of 21 mils and each of the outer layers 22, 24 may have a thickness of 3.5 mils. It is found by applicant that increasing the expansion of molybdenum from 4 to 6 mils per inch at 800° C. and restraining the expansion of the Inconel outer layers from 12.3 to 6 mils per inch at 800° C., does not exceed the natural elastic limits of these materials over the temperature range from about room temperature to a temperature of about 800° C.

The foregoing optimum thickness values of the core 20 and the outer layers 22, 24 may be varied and yet result in an acceptable expansion response within the limits fixed by the dashed curves 34, 36, shown in the graph of FIG. 5. Thus, applicant has found that the molybdenum core 20 may have a thickness of 20 mils and the two outer layers 22, 24 of Inconel may each have a thickness of 5 mils. These thicknesses favor the outer layers and cause the composite structure to have an expansion response indicated by dashed curve 34. On the other hand, if the thickness of the molybdenum core 20 is increased to 23 mils and the outer layers 22, 24 have a thickness of 3 mils each, the composite structure 10 has a smaller thermal response than the ceramic body 16, such as indicated by the dashed curve 36 of FIG. 4. In each of these departures from the optimum thickness dimensions referred to, the resultant difference in thermal expansion response of the composite structure 10 and the ceramic body 16 may be accommodated by the seal 18 without rupture thereof.

The seal 18 between an edge of the composite structure 10 and the ceramic body 16 may be made by first metallizing the surface portion of the body 16 to be engaged at the seal, with molybdenum such as by the molybdenum salt technique, and then plating the resultant molybdenum surface with a metal such as nickel, which the brazing material readily wets. A brazing material such as is known commercially as Nioro and having a melting point of 950° C. is then interposed between the metallized surface of the ceramic body 16 and an edge of the composite structure 10. The assembly so formed is then heated to the melting point temperature of the brazing material. The brazing material selected should have a higher melting point temperature than the temperature at which the brazed structure is to be used. Where the structure is to be used at a temperature of about 800° C., the brazing material may be Nioro or any other material, such as copper having a melting point temperature of 1083° C.

In practicing one way of making the composite structure 10, as shown in FIG. 3, a sheet or layer 22 is supported on a flat surface. A foil-like thin sheet 26 of a metal such as nickel having a thickness of about 0.1 mil, is laid over the exposed surface of the layer 22. A layer 20 is then placed over the sheet 26. A second sheet 26 is placed on the exposed surface of the layer 20 and the final layer 24 is placed on the second sheet 26. This forms a loose assembly. The loose assembly is then placed in a press and subjected to a pressure of from 5,000 to 25,000 pounds per square inch. At the same time, the assembly is heated to a temperature of from 600° C. to 1000° C. As a consequence of this pressure and temperature, the metal of the two sheets 26 is caused to diffuse into the layers 20, 22, 24. This strongly bonds the layers into a composite sheet metal structure adapted to withstand temperature induced stresses at a temperature of about 800° C. and higher, and stresses produced in forming the structure to desired shape such as by drawing and spinning.

The resultant flat composite sheet metal structure may be formed to any desired shape, such as tubular or dish-shaped for example, as by die drawing or spinning. To facilitate the drawing operation, the wall thickness of the structure should not be more than can be conveniently handled by the dies. This thickness will vary with the hardness of the material of the several layers. Where the sheet-metal structure comprises a molybdenum core and outer layers of Inconel alloy, the thickness of the structure should not exceed about 30 mils for convenient drawing.

While Inconel alloy has been referred to as the material of the outer layers 22, 24, it is feasible to employ other materials for these layers. Such other materials may be any ferrous-nickel or cobalt alloy having the features of moderately high strength, resistance to oxidation at elevated temperatures, and a coefficient of expansion higher than that of aluminum oxide or other material of which the member 16 may be made. Representative materials for the layers 22, 24 are stainless steel Haynes No. 25 Alloy (a cobalt base alloy) and tool steels. A material of moderately high strength such as those referred to, is preferred because it can be shaped satisfactorily as by drawing. Resistance to oxidation is desirable since in a completed device, one of the layers 22, 24 is exposed to the atmosphere.

In addition to molybdenum, the inner or core layer 20 may be made of tungsten or molybdenum alloys such as TZM, which is a commercially available alloy.

Figure 4:
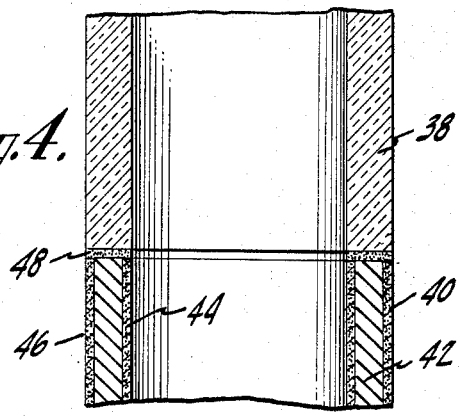
FIG. 4 is an elevational view in section of a tubular composite sheet-metal part and a tubular ceramic part sealed or bonded in end-butt joints.

In FIG. 4 is shown a butt seal between one end of a tubular ceramic member 38 and an end of a tube 40. The tube 40 comprises a composite sheet-metal structure embodying the invention. Thus, it includes a core layer 42 of molybdenum for example, and outer layers 44, 46 of Inconel, for example. The bond 48 between the ends of the member 38 and tube 40 may be a braze comprising Nioro, for example. The wall thickness of the tube 40 is sufficiently small (no more than about 30 mils) to facilitate forming the tube from flat stock as by die drawing.

Figure 6:
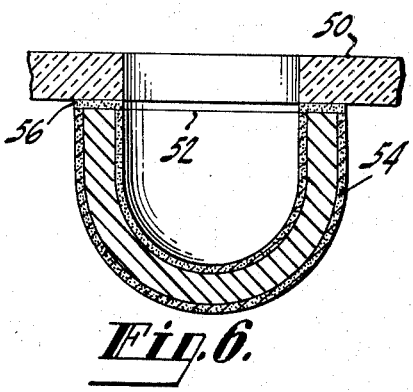
FIG. 6 shows a sectional elevation of a dish-shaped composite sheet-metal part having its edge sealed to a ceramic part.

FIG. 6 shows a seal between an apertured ceramic wafer or ring 50 made of aluminum oxide, for example, and a circular edge 52 of a dish-shaped composite sheet-metal structure 54 incorporating the invention. The several layers of the structure may be similar to the layers described in connection with tube 40, shown in FIG. 5. A brazed joint 56 effectively seals the edge 52 to a side of the wafer 50. The brazing material may be Nioro, for example. Since the sheet-metal structure 54 may be shaped from flat stock by spinning, its thickness should be no greater than is required for convenience in the spinning operation.

What is claimed is:
1. A sealed structure comprising:
 (a) a composite sheet metal member having at least three layers of metal bonded together and terminating in a common edge,
 (b) a ceramic member having a flat surface,
 (c) said edge being brazed to said flat surface,
 (d) the outer ones of said layers having substantially mutually similar thermal expansion responses laterally of said sheet metal member throughout a given temperature range, an intermediate one of said layers having a different thermal expansion response laterally of said sheet metal member throughout said temperature range than said similar responses, the resultant of said similar and said different thermal expansion responses laterally of said sheet metal member being substantially equal to the thermal expansion response of said ceramic member at said temperature,
 (e) whereby the brazed relation of said sheet metal member and said ceramic member is preserved from rupture throughout said temperature range.
2. A sealed structure comprising:
 (a) a ceramic member having a flat surface and a predetermined thermal expansion response at a given temperature,
 (b) a composite sheet-metal member comprising at least three layers and having an edge defined by edges of said layers, two of said layers of metal having a substantially equal thickness and a lateral thermal expansion response at said given temperature, said lateral expansion response differing from said predetermined expansion response in one direction, the other of said layers being intermediate and bonded to said two layers, said intermediate layer having a lateral thermal expansion response at said given temperature differing from said predetermined thermal expansion response in a direction opposite to said one direction, and
 (c) a brazed seal between said surface of the ceramic member and said edge, and
 (d) said two layers having a combined thickness for effectively controlling the lateral thermal expansion response of said intermediate layer to cause said composite structure to have substantially said predetermined thermal expansion response laterally at said given temperature,
 (e) whereby the substantially equal lateral thermal expansion responses of said edge and said ceramic member contribute to a preservation of said seal from rupture.
3. A seal structure according to claim 2 and wherein said edge is sealed to said surface in an elongated seal region and said seal region is preserved from rupture from about room temperature up to a temperature of about 800° C.
4. A sealed structure comprising:
 (a) a ceramic member having a surface and a predetermined thermal expansion response through a temperature range of from about room temperature to about 800° C.,
 (b) a composite sheet metal member having an edge,
 (c) and a seal between said ceramic member and said surface,
 (d) said sheet metal member comprising two layers of metal having susbtantially equal thickness and a higher lateral thermal expansion response through said temperature range than said ceramic member, and a metal layer intermediate and bonded to said two layers and having a lower lateral thermal expansion response through said temperature range than said ceramic member, said edge being defined by said two and said intermediate layers, the resultant of said higher and lower thermal expansion responses along said edge being substantially equal to said predetermined expansion response of said ceramic member through said temperature range,
 (e) whereby said seal is preserved from rupture when subjected to a temperature within said range.
5. A structure comprising:
 (a) a sheet metal body having two groups of metal layers having their faces strongly bonded together, one of said groups comprising two layers having a relatively large thermal expansion response at a given temperature, another of said groups comprising a layer intermediate said two layers and having a relatively small thermal expansion response at said given temperature,
 (b) each of said two layers and said intermediate layer having a thickness for causing said sheet-metal structure to have a lateral thermal expansion response that is intermediate said relatively large and small thermal expansion responses at said given temperature,
 (c) said body having an edge defined by edges of said groups of metal layers, and
 (d) a member having substantially said intermediate thermal expansion response sealed to said edge,
 (e) whereby the seal between said edge and said member is preserved from rupture at said given temperature.
6. A structure according to claim 5 and wherein:
 (a) said one of said groups of layers of said body comprise two layers made of an alloy consisting by weight of 76% nickel, 15% chromium and 9% iron, each of said two layers having a thickness of from 3 to 5 mils, and the other of said groups comprises a layer made of a metal selected from the group consisting of molybdenum and tungsten, said intermediate layer having a thickness of from 20 to 23 mils,
 (b) each of said two layers and said intermediate layer being strongly bonded together by a relatively strong metal diffused into said layers,
 (c) said structure having a maximum thickness of about 30 mils,
 (d) whereby said sheet-metal structure is adapted to be shaped by drawing and spinning to a form having an edge and said edge is adapted to be sealed effectively to a member having substantially the expansion response of aluminum oxide at a temperature at least as high as about 800° C.
7. A structure according to claim 5 and wherein:
 (a) said member is made of aluminum oxide, and
 (b) said sheet metal body comprises a composite sheet-metal member comprising two layers made of a metal selected from the group consisting of (1) an alloy consisting by weight of 76% nickel, 15% chromium and 9% iron, (2) stainless steel, (3) a cobalt base alloy known as Haynes No. 25 alloy and (4) tool steels; an intermediate layer made of a metal selected from the group consisting of (1) molybdenum, (2) tungsten and (3) high-strength molybdenum alloys; and a layer of nickel between each of said two layers and said intermediate layer, said layer of nickel being at least partly diffused into each of said two and intermediate layers and forming relatively strong bonds between adjacent ones of said layers, (c) the thickness of each of said two layers being from 3 to 5 mils, the thickness of said intermediate layer being from 20 to 23 mils and the thickness of said nickel layer prior to diffusion thereof into said two and intermediate layers being about 0.1 mil.

References Cited by the Examiner
UNITED STATES PATENTS

| | | | |
|---|---|---|---|
| 1,288,916 | 12/1918 | Keyes | 189—36.5 |
| 3,057,445 | 10/1962 | Brannes | 189—36.5 |
| 3,171,519 | 3/1965 | Nolte | 189—36.5 |

HARRISON R. MOSELEY, *Primary Examiner.*

P. M. CAUN, *Assistant Examiner.*